US010107711B2

(12) United States Patent
Balke et al.

(10) Patent No.: US 10,107,711 B2
(45) Date of Patent: Oct. 23, 2018

(54) REDUCING THERMAL EFFECTS DURING LEAK TESTING

(71) Applicant: InterTech Development Company, Skokie, IL (US)

(72) Inventors: David J. Balke, Morton Grove, IL (US); Jacques E. Hoffman, Lincolnwood, IL (US)

(73) Assignee: InterTech Development Company, Skokie, IL (US)

( * ) Notice: Subject to any disclaimer, the term of this patent is extended or adjusted under 35 U.S.C. 154(b) by 336 days.

(21) Appl. No.: 14/996,802

(22) Filed: Jan. 15, 2016

(65) Prior Publication Data

US 2017/0205310 A1 Jul. 20, 2017

(51) Int. Cl.
*G01M 3/28* (2006.01)
*G01M 3/00* (2006.01)

(52) U.S. Cl.
CPC .......... *G01M 3/2876* (2013.01); *G01M 3/002* (2013.01)

(58) Field of Classification Search
CPC ............................ G01M 3/2876; G01M 3/002
USPC ....................................................... 73/40.5 R
See application file for complete search history.

(56) References Cited

U.S. PATENT DOCUMENTS

| 3,800,586 A * | 4/1974 | Delatorre ............ G01M 3/3236 73/49.2 |
| 4,532,795 A * | 8/1985 | Brayman ............ G01M 3/3254 374/4 |
| 4,625,545 A | 12/1986 | Holm et al. |
| 4,686,851 A * | 8/1987 | Holm .................. G01M 3/3263 73/49.2 |
| 4,715,214 A * | 12/1987 | Tveter ................ G01M 3/3236 702/51 |
| 4,776,206 A | 10/1988 | Armstrong et al. |
| 4,782,689 A | 11/1988 | Derome et al. |
| 5,065,350 A * | 11/1991 | Fedder ................ G01M 3/3263 702/51 |
| 5,078,006 A | 1/1992 | Maresca, Jr. et al. |
| 5,152,167 A | 10/1992 | Moody |
| 5,363,689 A | 11/1994 | Hoffmann et al. |

(Continued)

FOREIGN PATENT DOCUMENTS

| JP | S56163432 A | 12/1981 |
| JP | 4056818 B2 | 3/2008 |

OTHER PUBLICATIONS

Gary Grebe, Catch the Leak Testing Drift, ProQuest Dialog, Quality 41.10 (Oct. 2002): 40-43.

(Continued)

*Primary Examiner* — Lisa Caputo
*Assistant Examiner* — Nathaniel T Woodward
(74) *Attorney, Agent, or Firm* — Fitch Even Tabin & Flannery, LLP (57) ABSTRACT

Embodiments of the inventive subject matter include a method and apparatus for performing a leak test. A fluid flows through a first aperture of a product and at least a portion of the fluid is allowed to exit the product through a second aperture while the fluid is flowing through the first aperture. The second aperture is closed in response to determining that a first threshold parameter is reached. The first aperture is closed in response to determining that a second threshold parameter is met. Then, a leak test can be performed.

23 Claims, 5 Drawing Sheets

(56) References Cited

U.S. PATENT DOCUMENTS

| | | | | |
|---|---|---|---|---|
| 5,546,789 | A * | 8/1996 | Balke | G01M 3/3281 73/40 |
| 5,827,950 | A * | 10/1998 | Woodbury | F23N 5/242 431/16 |
| 5,847,264 | A * | 12/1998 | Martin | G01M 3/3236 702/51 |
| 5,948,969 | A | 9/1999 | Fierro et al. | |
| 6,189,377 | B1 * | 2/2001 | Schoeffel | F02M 65/001 73/114.45 |
| 6,244,100 | B1 * | 6/2001 | Hastings | G01M 3/24 73/40.5 A |
| 6,279,383 | B1 * | 8/2001 | Balke | G01M 3/2876 73/40 |
| 6,435,010 | B1 * | 8/2002 | Johnson | G01M 3/3236 73/40 |
| 6,626,028 | B1 | 9/2003 | Fiala et al. | |
| 6,662,634 | B2 * | 12/2003 | Lehmann | G01M 3/3281 73/1.62 |
| 6,854,318 | B2 | 2/2005 | Sagi et al. | |
| 7,290,440 | B2 * | 11/2007 | Gocho | G01M 3/2815 73/49.2 |
| 7,594,424 | B2 | 9/2009 | Fazekas | |
| 2007/0169543 | A1 * | 7/2007 | Fazekas | G01M 3/2815 73/49.2 |

OTHER PUBLICATIONS

Ken Dean, Fuel Filter Plant Ups Output with Mass-Flow Leak Testing System, ProQuest Dialog, I&CS (Instrumentation & Control Systems) 65.n7 (Jul. 1992): 66(3).

Yan Shi et al., Temperature Effect Compensation for Fast Differential Pressure Decay Testing, ProQuest Dialog, Measurement Science and Technology 25.6 (Jun. 2014): 065003 (8.).

Joe Pustka, Leak Testing Techniques and Trends: Leak Testing Can Ensure Product Performance and Safety, ProQuest Dialog, Quality 52.11 (Nov. 2013): S15(3).

VTech Cool Innovation, Leak Detection Methods: A Comparative Study of Technologies and Techniques Short Version, Apr. 22, 2014.

* cited by examiner

REDUCING THERMAL EFFECTS DURING LEAK TESTING

FIELD

Embodiments of the inventive subject matter relate generally to leak testing methods and apparatus, and more particularly to leak testing methods and apparatus including a purge phase.

BACKGROUND

Products through which fluids flow (e.g., hoses, manifolds, tubes, lines, pumps, containers, etc.) are susceptible to leaks. A product can be a part or unit. Many manufacturers of such products test each item for leaks before shipping the items to customers. For example, a manufacturer may leak test each item as part of a manufacturing process for a product. If leak testing requires a significant amount of time, the leak testing can impede the manufacturing process and increase manufacturing time for each item. Consequently, manufacturers strive to perform fast and accurate leak testing so as to decrease the manufacturing time per item.

Leak tests are generally performed by filling an item with a fluid, such as a gas. This is generally referred to as the "fill phase." The item is filled until a specified required test pressure (e.g., 10 psig) is achieved. During the fill phase, the pressure inside the item increases from zero psig to the required test pressure (e.g., from 0 psig to 10 psig). If the item is filled with fluid quickly, heat builds and is unable to dissipate as quickly as it is generated causing the temperature of the fluid inside the item to increase (i.e., adiabatic heating occurs). An accurate leak test cannot be performed until time has elapsed for the heat to dissipate sufficiently. The time necessary for the heat to dissipate sufficiently is called the "stabilize phase." Once the heat has dissipated, a leak test measurement can be performed. For example, flow sensors can detect flow of the fluid within the item that can indicate a leak. This is called the "test phase." It would be beneficial to reduce the amount of time necessary for the heat to dissipate (i.e., reduce the duration of the stabilize phase) because it would decrease the total time necessary for the leak test and in turn decrease manufacturing time.

BRIEF DESCRIPTION OF THE FIGURES

Embodiments of the invention are illustrated in the figures of the accompanying drawings in which.

DETAILED DESCRIPTION

Introduction

This section provides an introduction to some embodiments of the inventive subject matter.

Figure 1:
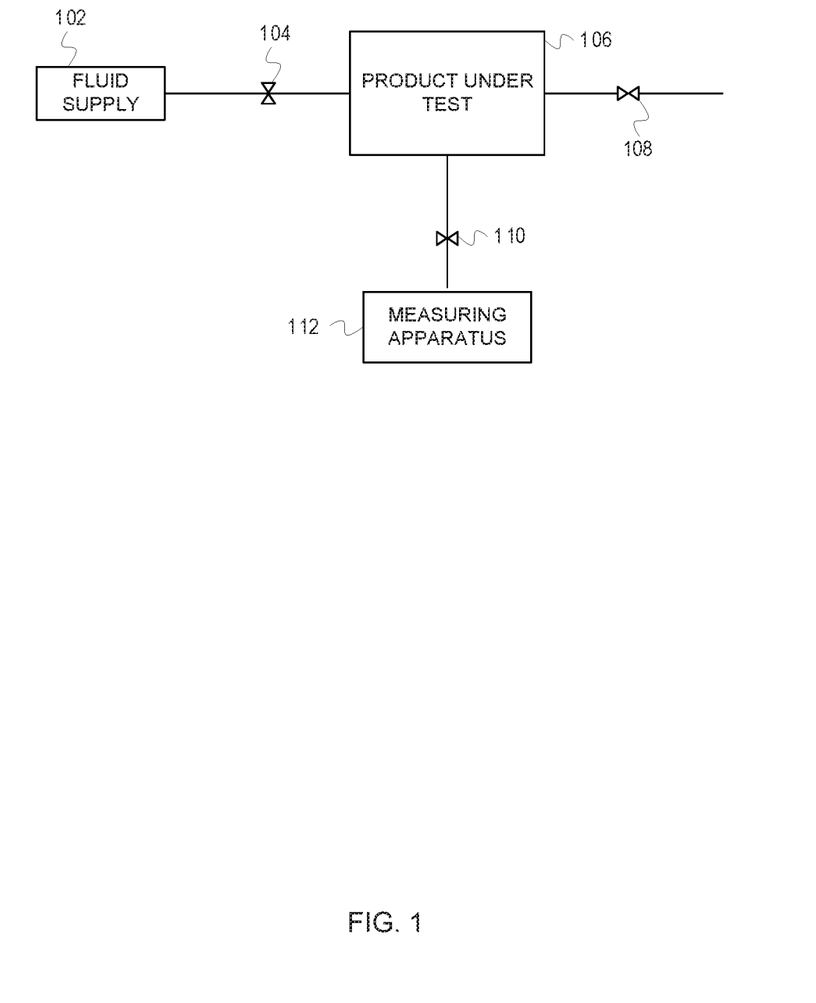
FIG. 1 is a block diagram of an example leak-testing apparatus.

FIG. 1 is a block diagram of an example leak-testing apparatus. The example leak-testing apparatus depicted in FIG. 1 is but an example leak-testing apparatus and many other arrangements exist. The example leak-testing apparatus includes a fluid supply 102, a volume under test (e.g., a container housing a product to be tested, a product to be tested, or the like, wherein the product at least in part defines the volume under test), a measuring apparatus 112, and a plurality of valves 104, 108, and 110. The volume under test can be entirely bounded by a "product," or the volume under test could consist of a "product" and required elements (fixture plates or the like) to create a closed volume.

During the leak test, the fluid supply 102 provides fluid to the volume under test to fill the volume under test with fluid. As depicted in FIG. 1, the volume under test is a product under test 106, and the fluid supply 102 provides fluid to the product under test 106 to fill the product under test 106 with fluid. The fluid can be any suitable gas (e.g., hydrogen, helium, ambient air, etc.) or liquid (e.g., water). In some embodiments, the fluid that is supplied to the product under test 106 can be explicitly conditioned to have any one of a number of properties. For example, the fluid can be conditioned to have a specific absolute temperature, differential temperature (e.g., a temperature that is a constant value above/below a temperature of the product under test or ambient temperature), relative or absolute humidity, fluid composition (e.g., gas composition), etc. The plurality of valves 104, 108, and 110 alternate between open and closed positions throughout the test. As depicted in FIG. 1, valves 104 and 110 represent closed valves (i.e., a valve in a position that does not allow fluid to pass through the valve), and valve 108 represents an open valve (i.e., a valve in a position that allows fluid to pass through the valve). At an appropriate time, the measuring apparatus 112 is used to measure a parameter of the volume under test that can be indicative of a leak. The measuring apparatus 112 can be any suitable measuring apparatus and measure any suitable parameter. For example, the measuring apparatus can be a flow sensor (e.g., a mass flow sensor, a volume flow sensor, etc.) that measures fluid flow in and/or around the product under test 106, a pressure sensor that measures fluid pressure in and/or around the product under test, a temperature sensor, a volume sensor, a thermometer, or a timer. The leak test measurement can thus be one or more of a pressure measurement, a flow measurement, a volume measurement, a temperature measurement, or a time measurement.

Although FIG. 1 illustrates a generic embodiment of a leak-testing apparatus, the following sections describe many other features and embodiments of the inventive subject matter.

Operating Environment

FIGS. 2A, 2B, 3A, and 3B depict the example leak-testing apparatus of FIG. 1 during different phases of a leak-testing process according to some embodiments. Although FIGS. 2A, 2B, 3A, and 3B depict four phases (i.e., a purge phase, a fill phase, a stabilize phase, and a test phase) and the discussion of FIGS. 2A, 2B, 3A, and 3B describe these four phases, all of the four phases listed may not be necessary and some embodiments may include fewer than the four phases described. Additionally, some embodiments may include more than the four phases described. For example, some embodiments may include an exhaust phase after the test phase in which the fluid exits the product under test. Although FIGS. 2A, 2B, 3A, and 3B depict each of the four phases as distinct phases, in some embodiments, operations of two or more of the four phases may overlap and the order in which the phases are completed may be different than the order described herein.

Although FIGS. 2A, 2B, 3A, and 3B depict only one supply valve (e.g., the supply valve 204 in FIG. 2A) and only one exhaust valve (e.g., the exhaust valve 208 in FIG. 2A), in some embodiments two or more supply valves and/or exhaust valves may be utilized. Additionally, although FIGS. 2A, 2B, 3A, and 3B depict a supply valve and an exhaust valve as positioned on a line that bifurcates a product under test, such an arrangement is not necessary and embodiments may deviate from such an arrangement. For example, in some embodiments, the supply valve(s) and exhaust valve(s) may be located on a same side of the product under test. Furthermore, the locations of the supply valve(s) and the exhaust valve(s) may be chosen based on a geometry of the product under test. For example, the locations of the supply valve(s) and the exhaust valve(s) may be chosen to achieve maximum fluid flow through the product under test, to achieve maximum turbulence during fluid flow through the product under test, and/or based on locations of preexisting apertures of the product under test.

Figure 2A:
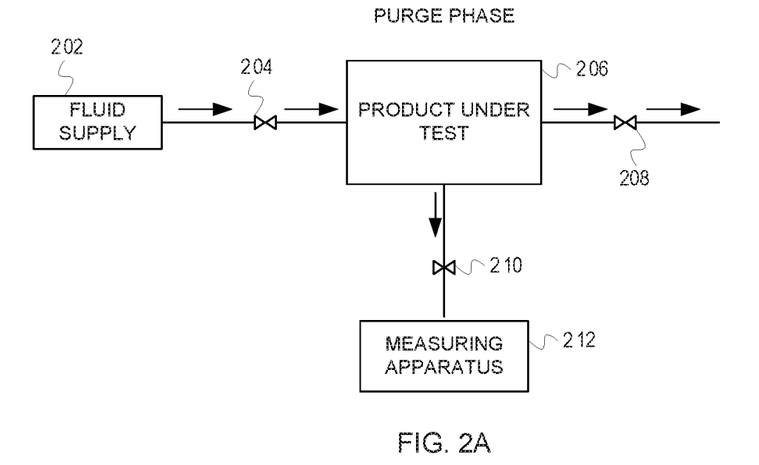
FIG. 2A is a block diagram depicting an example leak-testing apparatus during a purge phase.

FIG. 2A is a block diagram depicting an example leak-testing apparatus during a purge phase. During the purge phase, the fluid supply 202 operates to provide fluid to the product under test 206. A supply valve 204 between the fluid supply 202 and the product under test 206 is in an open position to allow fluid to flow from the fluid supply 202 through a first aperture of the product under test 206. While the fluid is flowing to the product through the first aperture, at least a portion of the fluid is allowed to exit the product 206 through a second aperture of the product 206 to remove heat created through adiabatic heating of the fluid as described below. An exhaust valve 208 allows the fluid to exit the product under test 206 by being in an open position. A valve 210 between the product under test 206 and the measuring apparatus 212 is in a closed position. As previously discussed, in some embodiments the measuring apparatus 212 may be located inside the product under test 206. In such embodiments, the valve 210 between the product under test 206 and the measuring apparatus 212 may not be present.

During the purge phase, fluid flows from the fluid supply 202, through the supply valve 204, into the product under test 206, and through the exhaust valve 208. Optimally, a flow rate of fluid through the supply valve 204 is greater than a flow rate of fluid through the exhaust valve 208, thus resulting in a pressure increase due to an increase in fluid inside the product under test 206. While pressure increases within the product under test 206, the temperature inside the product under test 206 also increase due to adiabatic heating (i.e., the energy of the fluid within the product under test 206 increases). While the pressure increases inside the product under test 206, fluid passes through the exhaust valve 208. Because fluid passes through the exhaust valve 208, heat buildup during the pressure increase within the product under test 206 will dissipate (i.e., the fluid having an increased energy level will exit the product under test 206 through the exhaust valve 208). Put simply, heated air exits the product under test 206 through the exhaust valve 208 during pressurization of the purge phase to remove excess heat from the system (i.e., the example leak test apparatus).

The fluid supply 202 continues to provide fluid to the product under test 206, and the supply valve 204 and the exhaust valve 208 remain open, until a first threshold for a parameter of the volume under test of the product 206 is reached. The parameter for which a first threshold is determined can be a time, a pressure, a volume of fluid supplied, or any other suitable condition that indicates that the volume under test is nearly ready for testing. In one embodiment, the parameter can be a pressure inside the part under test. For example, the first threshold can be pressure near a required test pressure, i.e., a pressure at which a leak test can be performed. Optimally, the first threshold, while less than the test pressure, is as close as possible, if not the same, as the test pressure. For example, if the test pressure is 10 psig, the first pressure may be 9.5, 9.9, or even 10 psig. In some embodiments, once the first pressure is reached, the fill phase begins.

In another embodiment, the first threshold can be a time period. For example, the first time period can be 10 seconds, and the first threshold is reached after 10 seconds. In embodiments in which the first threshold is a time period, the length of the time period can be calculated. For example, if the flow rate of the fluid through the supply valve 204 and the flow rate of fluid through the exhaust valve 208 are known, the length of time required to achieve a desired pressure within the product under test 206 can be calculated. Alternatively, the length of the first time period can be determined experimentally. In another embodiment, the exhaust valve 108 will remain open until a predefined volume of fluid has passed through the exhaust valve 208, in which case the first threshold is the predefined volume of fluid passing through the exhaust valve. For example, even if a desired pressure is reached, the fill phase will not begin (i.e., the exhaust valve 108 will not close) until the predefined volume of fluid has passed through the exhaust valve 208, which passing fluid carries away heat. Additionally, in some embodiments, the fill phase will not begin until the first threshold is reached and the predefined volume of fluid has passed through the exhaust valve 208.

Figure 2B:
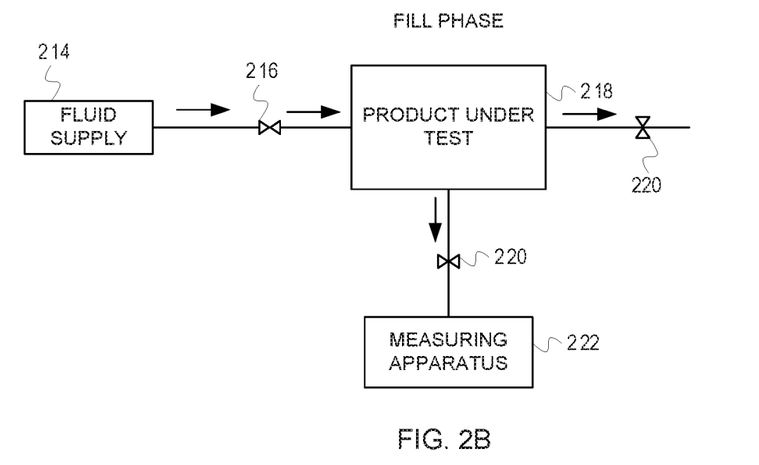
FIG. 2B is a block diagram depicting an example leak-testing apparatus during a fill phase.

FIG. 2B is a block diagram depicting an example leak-testing apparatus during a fill phase. During the fill phase, the fluid supply 214 continues to provide fluid to the product under test 218, the supply valve 216 remains open, the valve 220 between the product under test 218 and the measuring apparatus 222 remains closed, and the exhaust valve 220 remains closed. Pressure within the product under test 218 continues to increase because the fluid supply 214 is providing fluid to the product under test 218, the supply valve 216 is open, and the exhaust valve 220 is closed. The fill phase continues until the second threshold is reached. For example, the second threshold can be a time, a pressure, a volume of fluid supplied, or any other suitable condition indicating a condition sufficient for starting a stabilization phase. As with the first threshold, the second threshold can be determined via calculation or experimentation. For instance, if the second threshold is a pressure at which a leak test should be made, once the second threshold pressure is reached, the stabilize phase begins.

Figure 3A:
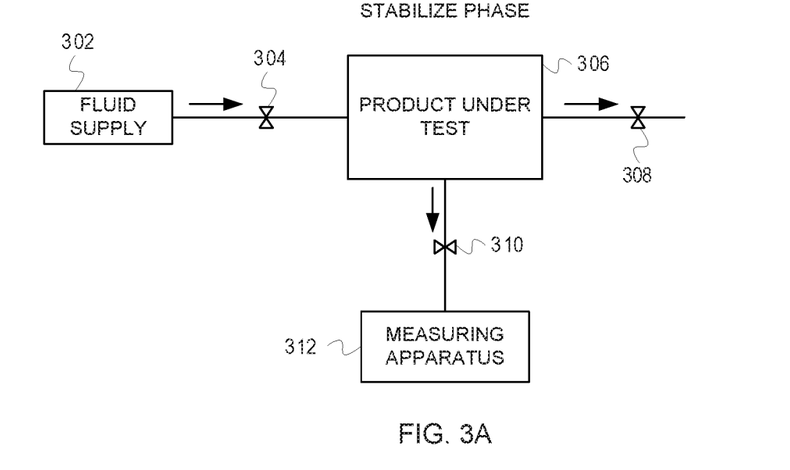
FIG. 3A is a block diagram of an example leak-testing apparatus during a stabilize phase.

FIG. 3A is a block diagram of an example leak-testing apparatus during a stabilize phase. During the stabilize phase, the fluid supply 302 does not provide fluid to the product under test 306, the supply valve 304 is closed, and the exhaust valve 308 is closed. Because the fluid supply 302 is not providing fluid to the product under test 306, the supply valve 304 is closed, and the exhaust valve 308 is closed, the amount of fluid inside the product under test 306 remains constant, assuming the product under test 306 does not have a leak.

One goal of the stabilize phase is to allow the pressure, temperature, volume, flow, etc. of the fluid in the product under test 306 to stabilize. Although the amount of fluid inside the product under test should remain constant, the pressure, temperature, volume, and flow of fluid inside the product under test 306 may not be constant during this time. For example, if the fluid is hotter than the product under test 306, heat may transfer from the fluid to the product under test 306, thus decreasing the temperature and pressure of the fluid inside the product under test 306. Changes, such as those listed above as well as others, occurring within the product under test 306 can impact accuracy of the leak test. For example, if the measuring apparatus 312 is a pressure sensor, a pressure decrease inside the product under test 306 may appear as a leak. However, the pressure decrease inside the product under test 306 may be caused solely by the heat transferring from the fluid to the product under test 306. In such a case, the leak-testing apparatus may indicate that the product under test 306 has a leak when in fact the product under test 306 does not have a leak. After the stabilize phase is complete (i.e., an amount of time has passed to allow the pressure, temperature, volume, flow, etc. of the fluid in the product under test 306 to stabilize sufficiently), the test phase begins.

Figure 3B:
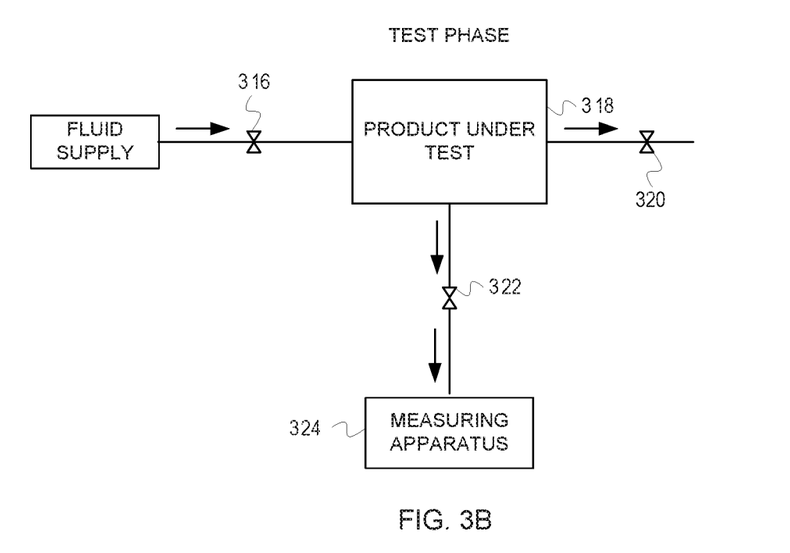
FIG. 3B is a block diagram of an example leak-testing apparatus during a test phase.

FIG. 3B is a block diagram of an example leak-testing apparatus during a test phase. During the test phase the supply valve 316 remains closed, the exhaust valve 320 remains closed, the valve 322 between the product under test 318 and the measuring apparatus 324 opens, and the measuring apparatus 324 performs a leak-test measurement. For example, the measuring apparatus 324 can make a pressure measurement (absolute or delta to a reference), flow measurement (absolute or delta to a reference), temperature measurement (absolute or delta to a reference), force measurement (absolute or delta to a reference), torque measurement (absolute or delta to a reference), tracer gas density measurement, change in density (e.g., as measured with an MRI test setup), volume measurement, or another other suitable measurement.

Although FIGS. 2A, 2B, 3A, and 3B and the related text describe performing a leak test by increasing the pressure within the product under test above atmospheric pressure, a leak test can performed by decreasing the pressure within the product under test below atmospheric pressure. In such embodiments, the fluid supply will remove fluid from the product under test during the purge phase (as opposed to supplying fluid to the product under test). Just as the purge phase reduces thermal effects of pressurization, the purge phase can reduce thermal effects of depressurization. In embodiments in which fluid is removed from the product under test during the purge phase, the energy of fluid in the product under test can decrease due to adiabatic effects (i.e., adiabatic cooling). During the purge phase, these thermal effects can be decreased by drawing fluid from the product under test while the supply valve and the exhaust valve are both in an open position. Ideally, the rate of flow of fluid through the exhaust valve (i.e., out of the product under test, for instance by actively pulling fluid from the product) will be greater than the rate of fluid flow through the input valve (i.e., into the product under test). In such an arrangement, the pressure in the product under test will decrease while both the input valve and the exhaust valve are open.

Additionally, although FIGS. 2A, 2B, 3A, and 3B and the related text describe the purge phase and the fill phase as two distinct phases, in some embodiments, the purge phase and the fill phase may overlap. For example, in one embodiment, the exhaust valve can begin in a first position (e.g., fully open) at the start of the purge phase move toward a second position (e.g., a less open or fully closed position) over time.

Figure 4A:
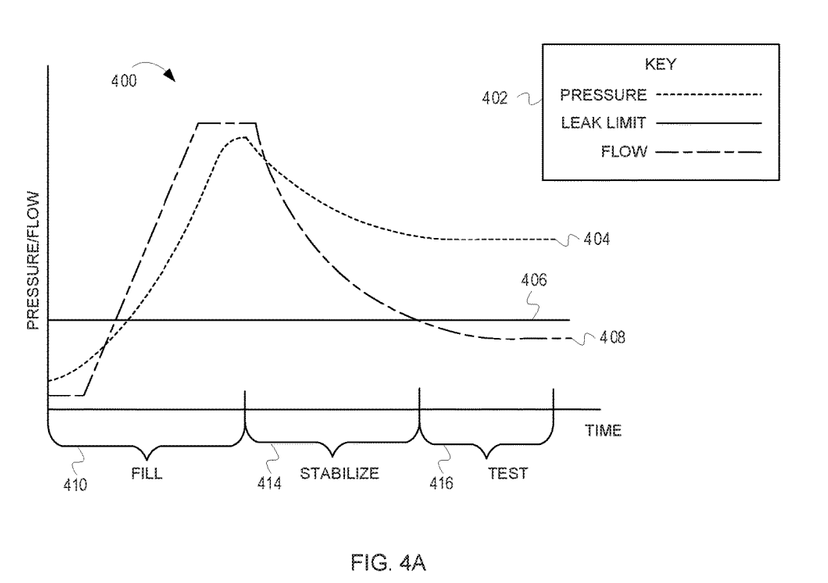
FIG. 4A is a chart 400 depicting pressure and flow during a leak test without a purge phase.

FIG. 4A is a chart 400 depicting pressure and flow during a leak test without a purge phase. More specifically, the chart 400 depicts pressure within a product under test versus time during a leak test without a purge phase, fluid flow versus time during a leak test without a purge phase, and a leak limit (i.e., a maximum acceptable flow for a "leak free" product). Pressure is depicted by line 404, flow (i.e., movement of fluid within the product, whether or not the product is open to the external environment) is depicted by line 408, and the leak limit is depicted by line 406, as indicated by the key 402. Flow can generally be described as the movement of fluid within the product, whether or not the product is open to an external environment. The time period in which the leak test is performed is divided into a fill stage 410, a stabilize phase 414, and a test phase 416.

During the fill stage 410, pressure increases as fluid is provided to a product under test. As pressure builds in the product under test, temperature of the fluid also increases because the pressure increase generates heat more quickly than the product under test and/or the atmosphere can absorb the heat. At the end of the fill phase 410, the pressure inside the product under test temporarily stabilizes.

However, as indicated by the ideal gas law (i.e., PV=nRT), pressure is directly proportional to temperature. Consequently, as the product under test absorbs heat from the fluid and the fluid cools, the pressure inside the product under test decreases. As indicated by line 404, the pressure inside the product under test decreases in a non-linear fashion in which the rate at which pressure decreases decelerates (i.e., the rate at which the pressure decreases over time, decreases). The temperature of the fluid continues to decrease until an equilibrium is reached and the temperature of the fluid is the same as the temperature of the product under test. Likewise, the pressure continues to decrease until this equilibrium is reached. While pressure is decreasing within the product under test, flow of the fluid within the product under test is likewise decreasing. As indicated by the line 408, fluid flow within the product under test decreases in a non-linear fashion in which the rate at which the flow decreases decelerates (i.e., the rate at which the flow of the fluid inside the product under test decreases with time, decreases). The pressure within the product under test and the flow of the fluid within the product under test decrease during the stabilize phase 414.

Once the pressure and/or flow of the fluid stabilize within the product under test, the test phase 416 can begin and a leak test measurement can be performed. In this example, the leak test measurement is a flow measurement. Put simply, the test phase can begin once the fluid flow within the product under test is below the leak limit indicated by line 406.

Figure 4B:
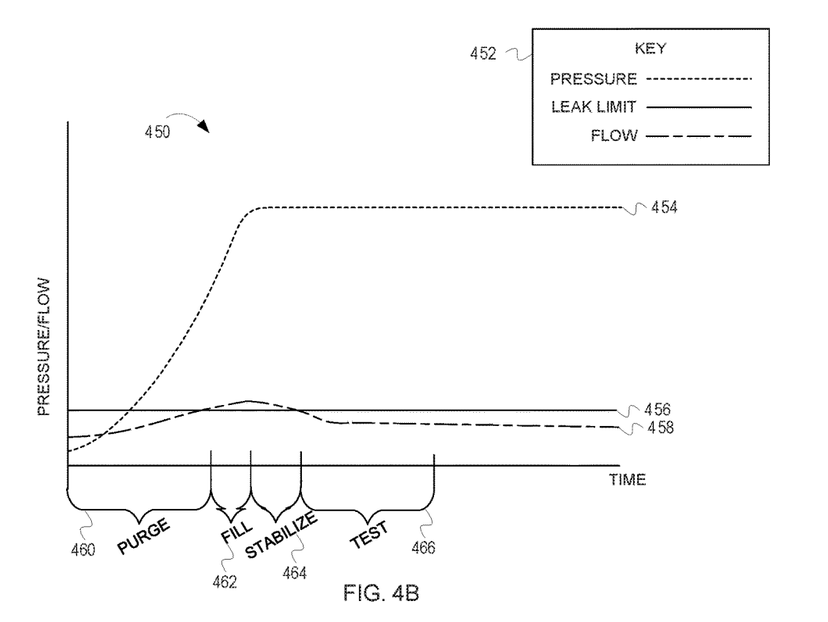
FIG. 4B is a chart 450 depicting pressure and flow during a leak test including a purge phase 460.

FIG. 4B is a chart 450 depicting pressure and flow during a leak test including a purge phase 460. More specifically, the chart 450 depicts pressure within a product under test versus time during a leak test including a purge phase 460, fluid flow versus time during a leak test including a purge phase 460, and a leak limit. Pressure is depicted by line 454, flow is depicted by line 458, and the leak limit is depicted by line 456, as indicated by the key 452. The time period in which the leak test is performed is divided into a purge stage 460, a fill stage 462, a stabilize phase 464, and a test phase 466.

During the purge phase 460, fluid is provided to the product under test through an input valve and the pressure increases within the product under test. Additionally, fluid exits the product under test during the purge phase 460 through an exhaust valve. Consequently, as pressure is increasing during the purge phase 460 within the product under test, fluid is passing through the product under test. The fluid passing through the product under test helps to "flush" or "purge" heat that is generated from the product under test. Once a first threshold is reached, the fill phase 462 begins.

During the fill phase 462, the exhaust valve that was open during the purge phase to allow fluid to pass through the product under test during the purge phase 460 closes. After the exhaust valve closes, the pressure within the product under test increases until a second threshold is reached. Once the second threshold is reached, the input valve is closed and the stabilize phase 464 begins.

During the stabilize phase, the pressure within the product under test and the flow of the fluid in the product under test stabilize. As indicated by line 454, the pressure within the product under test decreases very little after the second threshold is reached (i.e., after the fill phase 462 ends). The pressure decreases very little (if at all) after the second threshold is reached because most (if not all) of the heat that was generated during the pressure increase of the test under product was "flushed" or "purged" from the system during the purge phase 460. Likewise, as indicated by line 458 the flow of the fluid within the product under test decreases very little after the second threshold is reached. As depicted by the chart 450, the flow of the fluid inside the product returns to a value below that of the leak limit very quickly. Consequently, the duration of the stabilize phase 464 is shortened due to the introduction of the purge phase 460. Because the duration of the stabilize phase 464 is shortened, the test phase 466 and leak-test measurement can begin sooner and the overall duration of the leak test is shortened. During the test phase 466, one or more leak test measurements are performed It should be noted that the duration of each phase depicted in FIGS. 4A-4B are not shown to scale. For example, although the test phase is depicted as requiring a relatively long time period, in some embodiments, the test phase may be instantaneous or near-instantaneous.

Example Operations

This section describes operations associated with some embodiments of the invention. In the discussion below, the flow diagrams will be described with reference to the block diagrams presented above. However, in some embodiments, the operations can be performed by logic not described in the block diagrams.

In certain embodiments, the operations can be performed by a processing device executing instructions residing on machine-readable media (e.g., software), while in other embodiments, the operations can be performed by a processing device including hardware and/or other logic (e.g., firmware). In some embodiments, the operations can be performed in series, while in other embodiments, one or more of the operations can be performed in parallel. Moreover, some embodiments can perform fewer than all of the operations shown in any flow diagram, or operations in addition to those shown in any flow diagram.

Figure 5:
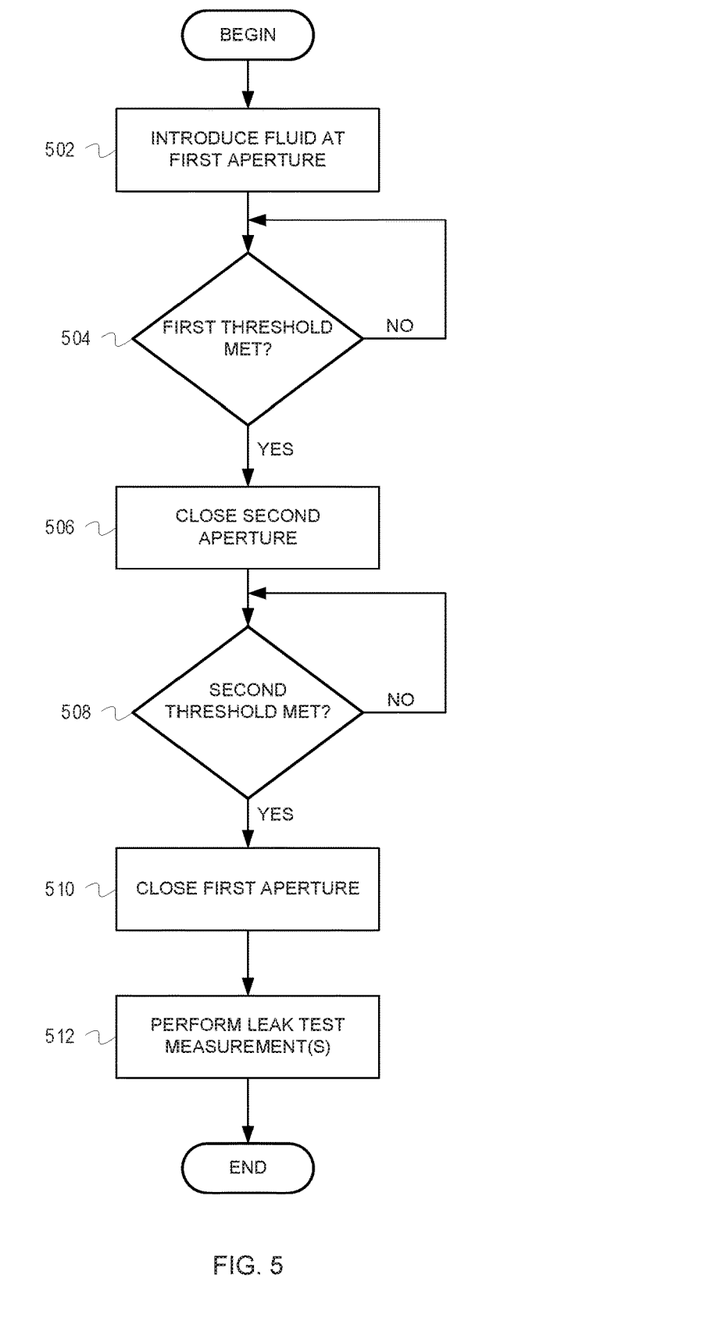
FIG. 5 is a flow chart depicting example operations for performing a leak test including a purge phase.

FIG. 5 is a flow chart depicting example operations for performing a leak test including a purge phase. In some embodiments, a processing device including a specialized leak test controller can control and direct other components during a leak test. For example, the leak test controller can operate a fluid supply, open and close valves, cause a measuring apparatus to perform a leak test measurement, and cause any other components to perform other suitable operations during a leak test. The flow begins at block 502.

At block 502, fluid is introduced at a first aperture. For example, a gas or liquid can be provided to a product under test through a supply valve. The flow continues at decision 504.

At decision diamond 504, it is determined whether a first threshold is met. In some embodiments, the first threshold is a pressure inside the product under test. For example, pressure inside the product under test can be measured directly. For example, a pressure measuring device can be used to determine if a pressure inside the product under test has met the first threshold pressure. Alternatively, pressure within the product can be determined by less direct means. For example, the pressure can be determined based on a rate at which fluid enters the product under test, a rate at which fluid exits the products under test, and an amount of time that has elapsed. In other embodiments, the first threshold can be a period of time. If a first threshold has not been met, the flow continues at block 502 where fluid is introduced at the first aperture. If the first threshold has been met, the flow continues at block 506.

At block 506, a second aperture is closed. For example, the second aperture can be an exhaust valve for allowing fluid to exit the product under test. The method continues at decision diamond 508.

At decision diamond 508, it is determined whether a second pressure is met. For example, the pressure measuring device can be used to determine if the pressure inside the product under test has met a required test pressure. Alternatively or additionally, a timer can be used to determine whether a second time period has elapsed. If the second threshold has not been met, the flow continues at block 506. If the second threshold has been met, the flow continues at block 510.

At block 510, the first aperture is closed. For example, the first aperture can be a supply valve for allowing the fluid to enter the product under test. The method continues at block 512.

At block 512, a leak test measurement is performed. For example, a sensor can be used to measure a volume of the fluid inside the product under test, the pressure of the fluid inside the product under test, flow of the fluid inside the product under test, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:
allowing fluid flow of a fluid into a product through a first aperture of the product via a first valve, wherein the product at least in part defines a volume under test;
while the fluid is flowing through the first aperture, allowing at least a portion of the fluid to exit the product through a second aperture of the product via a second valve to remove heat created through adiabatic heating of the fluid;
while the fluid is flowing through the first aperture and the second aperture, determining that a first threshold for a parameter of the volume under test is reached;
in response to determining that the first threshold is reached, closing the second valve;
determining that a second threshold for the parameter of the volume under test is reached;
in response to determining that the second threshold is reached, closing the first valve;
opening, after the closing of the first valve, a third valve, wherein the third valve controls fluid flow between the volume under test and a measuring apparatus; and
performing, by the measuring apparatus after the opening of the third valve, one or more leak test measurements on the volume under test.

2. The method of claim 1, further comprising keeping the first valve closed during the performing the one or more leak test measurements on the volume under test.

3. The method of claim 1, wherein the one or more leak test measurements include at least one of a pressure measurement, a flow measurement, a volume measurement, a temperature measurement, a force measurement, a torque measurement, and a density measurement.

4. The method of claim 1, wherein a fluid flow rate through the first aperture is greater than a fluid flow rate through the second aperture.

5. The method of claim 1, wherein the first threshold and the second threshold are any one of a time period, pressure, volume, mass flow, or volume flow.

6. The method of claim 1, wherein the first aperture comprises two or more independent apertures.

7. The method of claim 1, wherein the second aperture comprises two or more independent apertures.

8. The method of claim 1, further comprising:
before closing the second valve, determining that a volume of fluid at least equal to a volume of the product has passed through the second aperture.

9. The method of claim 8, wherein the determining that a volume of fluid at least equal to a volume of the product has passed through the second aperture is based on a fluid flow rate through the second aperture and an elapsed time.

10. The method of claim 1, wherein the determining that the first threshold is reached and the second threshold is reached is based, at least in part, on a fluid flow rate through the first aperture, a fluid flow rate through the second aperture, and time elapsed.

11. One or more non-transitory machine-readable storage media, the one or more non-transitory machine-readable storage media having instructions stored therein, which when executed by one or more processors, cause the one or more processors to perform operations comprising: causing fluid to be introduced through a first aperture of a product via a first valve, wherein at least a portion of the fluid passes through the product and exits through a second aperture of the product via a second valve, wherein the product at least in part defines a volume under test; determining that a first threshold for a parameter of the volume under test is reached; in response to determining that the first threshold is reached, causing the second valve to close; determining that a second threshold for the parameter of the volume under test is reached; in response to determining that the second threshold is reached, causing the first valve to close; opening, after the first valve is closed, a third valve, wherein the third valve controls fluid flow between the volume under test and a measuring apparatus; and after the opening of the third valve, causing one or more leak test measurements to be performed by the measuring apparatus.

12. The one or more non-transitory machine-readable storage media of claim 11, the operations further comprising: keeping the first valve closed during performance of the one or more leak test measurements.

13. The one or more non-transitory machine-readable storage media of claim 11, wherein the one or more leak test measurements include at least one of a pressure measurement, a flow measurement, a volume measurement, a temperature measurement, a force measurement, a torque measurement, and a density measurement.

14. The one or more non-transitory machine-readable storage media of claim 11, wherein a fluid flow rate though the first aperture is greater than a fluid flow rate through the second aperture.

15. The one or more non-transitory machine-readable storage media of claim 11, wherein the first threshold and second threshold are any one of a time period, pressure, volume, mass flow, and volume flow.

16. The one or more non-transitory machine-readable storage media of claim 11, the operations further comprising: before the causing the second valve to close, determining that a volume of fluid at least equal to a volume of the product has passed through the second aperture.

17. The one or more non-transitory machine-readable storage media of claim 16, wherein the determining that a volume of fluid at least equal to a volume of the product had passed through the second aperture is based on a fluid flow rate through the second aperture and an elapsed time.

18. The one or more non-transitory machine-readable storage media of claim 11, wherein the determining that the first threshold is reached and the second threshold is reached is based, at least in part, on a fluid flow rate through the first aperture, a fluid flow rate through the second aperture, and time elapsed.

19. A leak testing apparatus for testing a product under test for leaks, the leak testing apparatus comprising:
a fluid supply configured to provide fluid to the product under test via a first valve, wherein the product under test at least in part defines a volume under test; and
a controller configured to:
cause the fluid supply to provide fluid via the first valve to the product under test, and while the fluid is flowing to the product under test allowing at least a portion of the fluid to exit the product under test through a second valve;
while the fluid is flowing to the product under test and exiting the product under test, determine that a first condition for the volume under test is met;
in response to the determination that the first condition is met, cause the second valve to close;
determine that a second condition for the volume under test is met;

in response to the determination that the second condition is met, cause the first valve to close;

after the first valve closes, cause a third valve to open, wherein the third valve controls fluid flow between the volume under test and a measuring apparatus; and after the third valve opens, cause the measuring apparatus to perform a leak test measurement.

20. The apparatus of claim 19, wherein the controller is further configured to: keep the first valve closed during performance of the leak test measurement.

21. The apparatus of claim 19, wherein the measuring apparatus is one or more of a pressure sensor, a flow sensor, a temperature sensor, a volume sensor, a thermometer, and a timer and the leak test measurement is one or more of a pressure measurement, a flow measurement, a volume measurement, a temperature measurement, and a time measurement.

22. The apparatus of claim 19, wherein one or more of the first valve and the second valve include two or more valves.

23. The apparatus of claim 19, the controller further configured to:

determine, before causing closing of the second valve, that at least a predefined volume of fluid has passed through the second valve.

* * * * *